C. R. BARNES.
Grain Separator.
No. 39,374.
Patented Aug. 4, 1863.
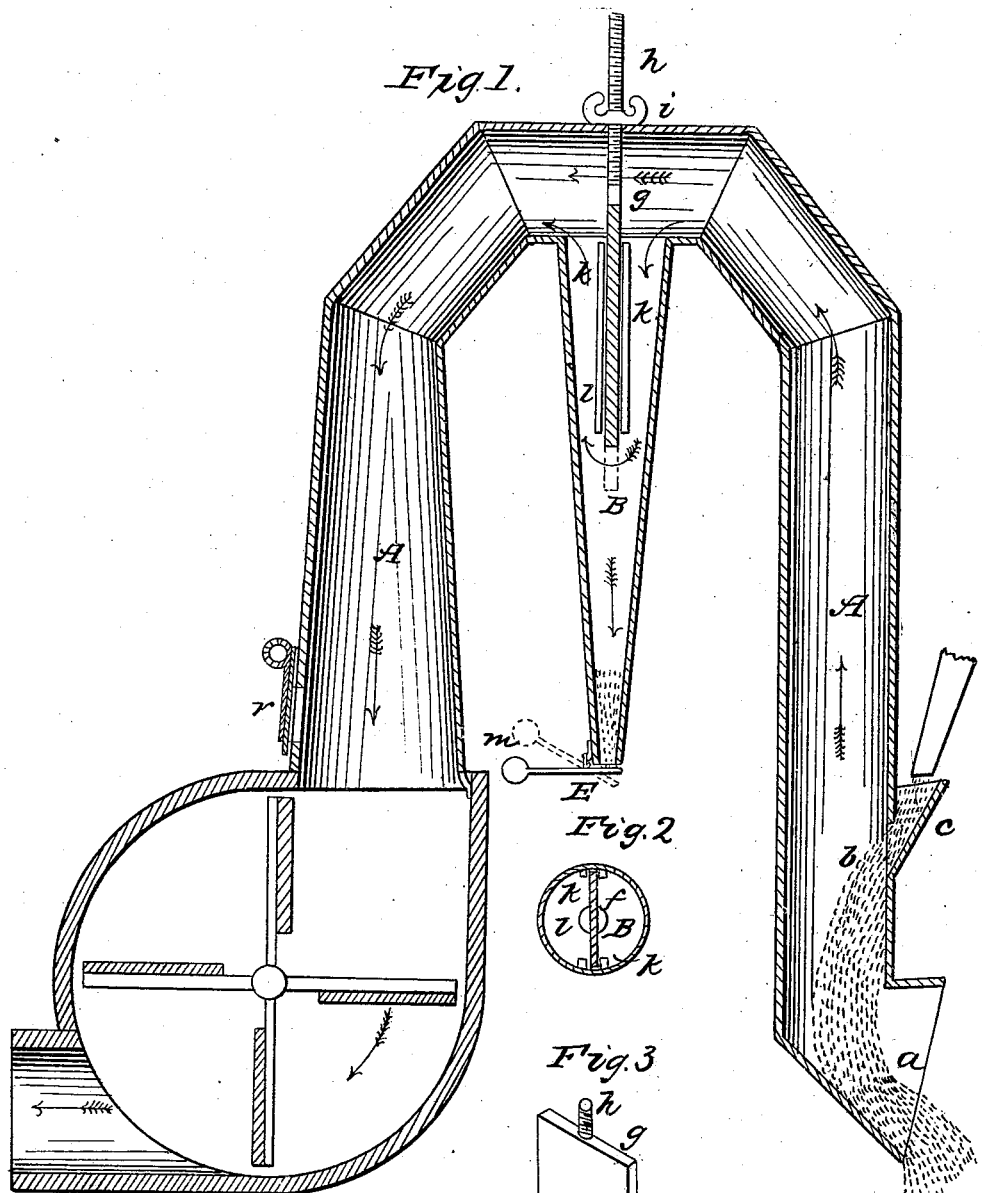
Witnesses
R. F. Osgood.
W. A. Loder.
Inventor
C. R. Barnes.
by J. Fraser & Co. attys

UNITED STATES PATENT OFFICE.

CHARLES R. BARNES, OF MUNCY, PENNSYLVANIA.

IMPROVEMENT IN GRAIN-SEPARATORS.

Specification forming part of Letters Patent No. 39,374, dated August 4, 1863.

*To all whom it may concern:*

Be it known that I, CHARLES R. BARNES, of Muncy, in the county of Lycoming and State of Pennsylvania, have invented certain new and useful Improvements in the Draft or Blast Tubes of Grain-Separators; and I do hereby declare that the following is a full and exact description thereof, reference being had to the accompanying drawings, making part of this specification.

Figure 1 is a central vertical section of my improved draft-tube as attached to a fan-case; Fig. 2, a transverse horizontal section of the refuse-seed receptacle; Fig. 3, a perspective view of the adjusting slide or stop detached.

Like letters of reference indicate corresponding parts in all the figures.

My invention has relation to that class of grain-separators in which an arched or double bent tube is employed for producing a draft or a blast through the grain. This tube A is of suitable size, and substantially of the form represented. It may be connected with any machine in which grain is to be separated from foreign matter, such as a hulling-machine or a smut-mill.

In the drawings it is represented opening at one end into a suitable exhaust-fan case, and being provided at the opposite end with an enlarged angular flaring induction-opening, $a$. In this tube, thus arranged, a draft is produced in the direction of the arrows, Fig. 1. At a suitable position above the induction air-opening $a$, in the vertical portion of the tube, is situated an opening, $b$, through which the uncleaned grain enters from an inclined spout outside, as represented at the right hand in Fig. 1. From this point the sound and heavy grain falls downward, and escapes through the air-opening, while the blighted grains, with grass-seed and all dust, pass upward in the draft. Were the conducting-spout outside to open directly into the draft-tube, it is manifest that the column of grain therein would fall in a solid and heavy body through the draft, and not have the impurities effectually separated. I distribute this solid mass of grain so as to receive the full benefit of the blast, and at the same time produce a secondary angular or side draft through the grain by means of a flaring lip or flange, $c$, of a size sufficient to extend around the opening $b$, and to rise a suitable distance above it, and to incline outward, so as to receive the grain without loss. This lip does not act as a hopper containing the material, but as a deflector. As the grain falls forcibly thereon the incline gives it a direction and throws it inward through the opening, across the body of the tube, the rebound being sufficient to distribute it most thoroughly. At the same time that it thus receives the full action of the whole column of vertical draft by being scattered over the whole diameter of the tube, a secondary draft is produced through the opening $b$, that is angular to the main draft. This gives the blighted grains and heavier seed a tendency laterally that greatly assists their rising through the tube. This arrangement is of great importance, and effectually accomplishes the purpose for which it is intended, and which is not accomplished, so far as I am aware, by any other device. The impurities thus separated from the sound grain pass upward through the arch, where I have an adjustable slide or stop, $f$, resting transversely across a portion of the main tube, and in a seed-receptacle, B, arranged as follows: The seed-receptacle opens from the under side of the arch, and extends downward a suitable distance, being preferably of conical shape, to secure a large opening at its top and but a small one at the bottom, substantially as represented in Fig. 1. The slide is of considerable length, its top, $g$, extending somewhat into the main passage, A, and having attached thereto a central vertical adjusting-screw, $h$, or equivalent, passing upward through the top of the arch, and operated by a thumb-nut, $i$. The slide is prevented from turning horizontally by resting between legs $k\ k$, or in some equivalent manner. By means of the thumb-screw the slide is adjusted higher or lower, as may be desired, or as the nature of the grain may require. The top $g$ of the slide, projecting within the passage of the main tube, serves as a stop for the blighted grains and other seeds, which, running low in the draft, and striking it, fall to the bottom of the receptacle. The principal portion of the dust which runs higher in the draft passes over the top of the slide and escapes into the fan-case, whence it is discharged, preferably through a tight tube leading outside the building, so that unnecessary dust is avoided within. At the same time that the foul seed strikes the slide and passes into the receptacle, a quantity of the dust falls with it. It is desirable to remove this dust as thoroughly as possible, and for this purpose I have left the passage *l* around the bottom of the slide entirely open, thus dividing the blast, so that as the dust reaches the bottom of the slide it is drawn around in the direction of the arrow and rises on the opposite side, instead of falling to the bottom, as it would do were this passage not left open.

I am aware that slides of various kinds have before been employed as a stop to the blighted grains and seeds, but not, so far as I am aware, an adjustable slide dividing the blast and leaving the passage open both at the bottom and top for the escape of dust.

I am enabled to adapt the machine perfectly to both light and heavy grains by adjusting the slide to a greater or less height, and I can thus also adapt it perfectly to the intensity of the draft.

In order to allow the escape of foul seed that collects in the receptacle, and at the same time to prevent, as much as possible, the entrance of air to obstruct or lessen the draft, I cover the bottom of the said receptacle with a hinged valve, E, fitting closely to the opening and held by a small weight, *m*, secured to the long arm *n* of the lever. When a certain amount of refuse has collected within the receptacle, it overbalances the weight, and the valve opens, allowing it to escape, and thus always keeps *f* free and unimpeded, so that it can work up and down without obstruction, and also keep the passage *l* open. The weight *m* may be such as to allow the receptacle to fill nearly to the bottom of the slide, so that the dust that falls with the seed will be acted on with greater force by the draft than if it fills the whole depth of the receptacle. The receptacle, by being narrowed at its bottom, allows the refuse to pass off more easily, and also secures a small eduction-opening, so that but little air can enter to obstruct the draft. The end of the draft-tube opening into the fan-case is gradually enlarged, as represented, in order to allow all dust, straws, and other substances to pass without choking. At a little distance above the end is a hole or passage of suitable size through the side of the tube, and this is covered by a sliding register, *r*, substantially as shown in Fig. 1. The object of this register is to act in combination with the slide *f*, by regulating the intensity of the draft at the same time that the slide is raised or lowered. This is accomplished by allowing a portion of the air to pass through said opening to fill the exhaust of the fan.

In cleaning heavy grains it is necessary that the draft should be more intense, and the register-opening is nearly or quite closed, while at the same time the slide is correspondingly depressed. In cleaning lighter grains the register is opened wider and the slide raised higher. By this arrangement the apparatus can be adapted to any condition or circumstances, and the register and slide adjusted to each other.

I do not claim, broadly, a slide or stop adjusting vertically, as I am aware that such has before been used; nor do I claim a slide adjusting sidewise to vary the size of the passage; but

What I claim as my invention, and desire to secure by Letters Patent, is—

1. The adjustable slide or stop *f*, raised or lowered by the screw *h*, or equivalent, in combination with the main tube A and receptacle B in such a manner that the draft is divided, a portion passing above and a portion beneath said slide, whereby such dust as falls with the foul seed in the receptacle is drawn up on the opposite side, substantially as herein specified.

2. In combination with the narrowing receptacle B and the adjustable slide *f*, as before described, the automatic weighted valve E, operating substantially as herein set forth.

3. In combination with the adjusting-slide *f*, the register *r*, for regulating the draft and adapting the machine to cleaning of different kinds of grain, substantially as described.

4. The arrangement of the main tube A, receptacle B, adjustable slide *f*, weighted valve E, deflector *c*, and register *r*, substantially as and for the purposes herein set forth.

In witness whereof I have hereunto signed my name in the presence of two subscribing witnesses.

CHAS. R. BARNES.

Witnesses:
D. CLAPP,
JOSHUA WALBRIDGE.